(12) United States Patent
Nagahashi

(10) Patent No.: US 6,231,117 B1
(45) Date of Patent: May 15, 2001

(54) AUTOMOTIVE WINDOW MOLDING WITH LIP POSITION ADJUSTMENT

(75) Inventor: Yuuji Nagahashi, Chiba (JP)

(73) Assignee: Kinugawa Rubber Ind. Co., Ltd., Chiba (JP)

( * ) Notice: Subject to any disclaimer, the term of this patent is extended or adjusted under 35 U.S.C. 154(b) by 0 days.

(21) Appl. No.: 09/362,960

(22) Filed: Jul. 30, 1999

(30) Foreign Application Priority Data

Jul. 31, 1998 (JP) .................................................. 10-216666

(51) Int. Cl.[7] ................................. B60J 1/00; E06B 7/00; E06B 3/96; E06B 3/99
(52) U.S. Cl. ......................... 296/201; 296/93; 296/96.21; 52/204.67
(58) Field of Search ....................... 296/93, 201, 146.15, 296/208, 96.21; 52/204.597, 204.67, 204.595

(56) References Cited

U.S. PATENT DOCUMENTS

| | | | |
|---|---|---|---|
| 4,434,593 | * 3/1984 | Horike et al. | 296/96.21 |
| 4,974,901 | * 12/1990 | Katayama | 296/96.21 |
| 4,984,839 | * 1/1991 | Miyakawa et al. | 296/96.21 |
| 4,986,594 | * 1/1991 | Gold et al. | 296/93 |
| 5,001,876 | * 3/1991 | Harper et al. | 296/96.21 |
| 5,035,459 | * 7/1991 | Yada | 296/93 |
| 5,149,168 | 9/1992 | Yada et al. | 296/201 |
| 5,163,731 | * 11/1992 | Gold | 296/146.15 |
| 5,248,179 | * 9/1993 | Biermacher et al. | 296/146.15 |
| 5,310,236 | * 5/1994 | Tamura et al. | 296/93 |
| 5,456,049 | * 10/1995 | Goto et al. | 296/93 |
| 5,538,314 | * 7/1996 | Young et al. | 296/146.15 |
| 5,558,387 | * 9/1996 | Sumida et al. | 296/96.21 |
| 5,561,954 | * 10/1996 | Watanabe et al. | 296/93 |
| 5,624,148 | * 4/1997 | Young et al. | 296/93 |
| 5,752,352 | * 5/1998 | Goto et al. | 296/93 |
| 5,771,652 | * 6/1998 | Nagata et al. | 296/93 |
| 5,803,527 | * 9/1998 | Fujiya | 296/146.15 |

FOREIGN PATENT DOCUMENTS

| | | | |
|---|---|---|---|
| 0195416 | * 11/1984 | (JP) | 296/93 |
| 0218220 | * 9/1987 | (JP) | 296/93 |
| 0193541 | * 8/1991 | (JP) | 296/93 |
| 5-185836 | 7/1993 | (JP) . | |
| 6-127266 | 5/1994 | (JP) . | |
| 406171354 | * 6/1994 | (JP) | 296/93 |

* cited by examiner

Primary Examiner—D. Glenn Dayoan
Assistant Examiner—Hilary Gutman
(74) Attorney, Agent, or Firm—Foley & Lardner

(57) ABSTRACT

A window molding includes an external wall portion covering a peripheral portion of an external major surface of the window glass, an internal wall portion covering a peripheral portion of an internal major surface of the window glass, and a base wall portion covering an end surface of the window glass. The base wall portion connects the external and internal wall portions together, and has a surface that is opposed and inclined to a side wall portion of a panel of the motor vehicle. A lip seals a space defined between the surface of the base wall portion and the side wall portion of the panel. The lip extends from a first location on the base wall portion to the side wall portion of the panel along portions of the molding covering straight edges of the window glass, and from a second location along portions of the molding which covers corners of window glass.

7 Claims, 2 Drawing Sheets

AUTOMOTIVE WINDOW MOLDING WITH LIP POSITION ADJUSTMENT

BACKGROUND OF THE INVENTION

1. Field of the Invention

The present invention relates to a window molding for a motor vehicle.

2. Description of the Prior Art

A conventional window molding is composed of a major portion which is formed so as to have a substantially U-shaped cross section and is mounted on a periphery of a window glass, and a lip which is connected with the major portion and which seals a space defined between the major portion and a panel of a motor vehicle. Being formed by an extrusion molding method, this type of window molding is known to have a cross section which is identical over its entire length. U.S. Pat. No. 5,149,168 corresponding to Japanese Patent First Provisional Publication No. 5-185836 discloses this type of molding.

Being curved at the corner of the window glass, the lip, in the along-the-corner direction becomes elongated at and near the end portion thereof. This effectively shortens the height of the lip and induces a drawback in that the lip is, at its corner portion, pressed against the panel of the motor vehicle with a reduced force, as compared with the straight portion(s) between the adjacent corner portions. Accordingly, when the motor vehicle is running at a high speed, a pressure difference between the inside sealed space (the interior of the vehicle) and an outside (the exterior) of the motor vehicle becomes greater. Thus, the lip may be detached from the panel, thereby allowing air flow between the inside sealed space and the outside of the motor vehicle. At the corner of the window glass, this may cause the lip to vibrate and impact against the panel. Moreover, since the lip is shortened at the corner, the lip is rather retracted toward the inside of the motor vehicle as compared with the straight portions of the window glass, thus causing a deteriorated external view.

SUMMARY OF THE INVENTION

It is therefore an object of the present invention to provide a window molding wherein an end of the lip contacts a panel of a motor vehicle in substantially the same position and in substantially the same condition along the entire periphery of a window glass.

There is a window molding for a window glass of a motor vehicle, according to the present invention. The window glass has first and second sides and a corner defined therebetween. The window molding comprises the following portions: i) An external wall portion for covering a peripheral portion on an external major surface of the window glass. ii) An internal wall portion for covering a peripheral portion on an internal major surface of the window glass. The internal wall portion is opposed to the external wall portion. iii) A base wall portion for covering an end surface of the window glass. The base wall portion connects the external and internal wall portions together, and has a surface that is opposed to a panel of the motor vehicle. The base wall portion has an inner end and an outer end that is nearer to an outside of the motor vehicle than the inner one. The surface is oriented so that a first distance between the outer end and the panel is shorter than a second distance between the inner end and the panel. iv) A lip for sealing a space defined between the surface of the base wall portion and the panel. The lip extends out along selected portions of the molding from a first location on the base wall portion with respect to one of the first and second sides of the window glass that is proximate the inner end of the base wall portion. At portions of the molding which are located at corners, the position at which the lip extends out from the base wall portion, is changed to a second location corresponding to a corner of window glass and one that is closer to the outer end of the base wall portion.

There is a molded window glass of a motor vehicle, according to the present invention. The molded window glass comprises the above-mentioned window glass and window molding.

DESCRIPTION OF THE PREFERRED EMBODIMENTS

Figure 1:
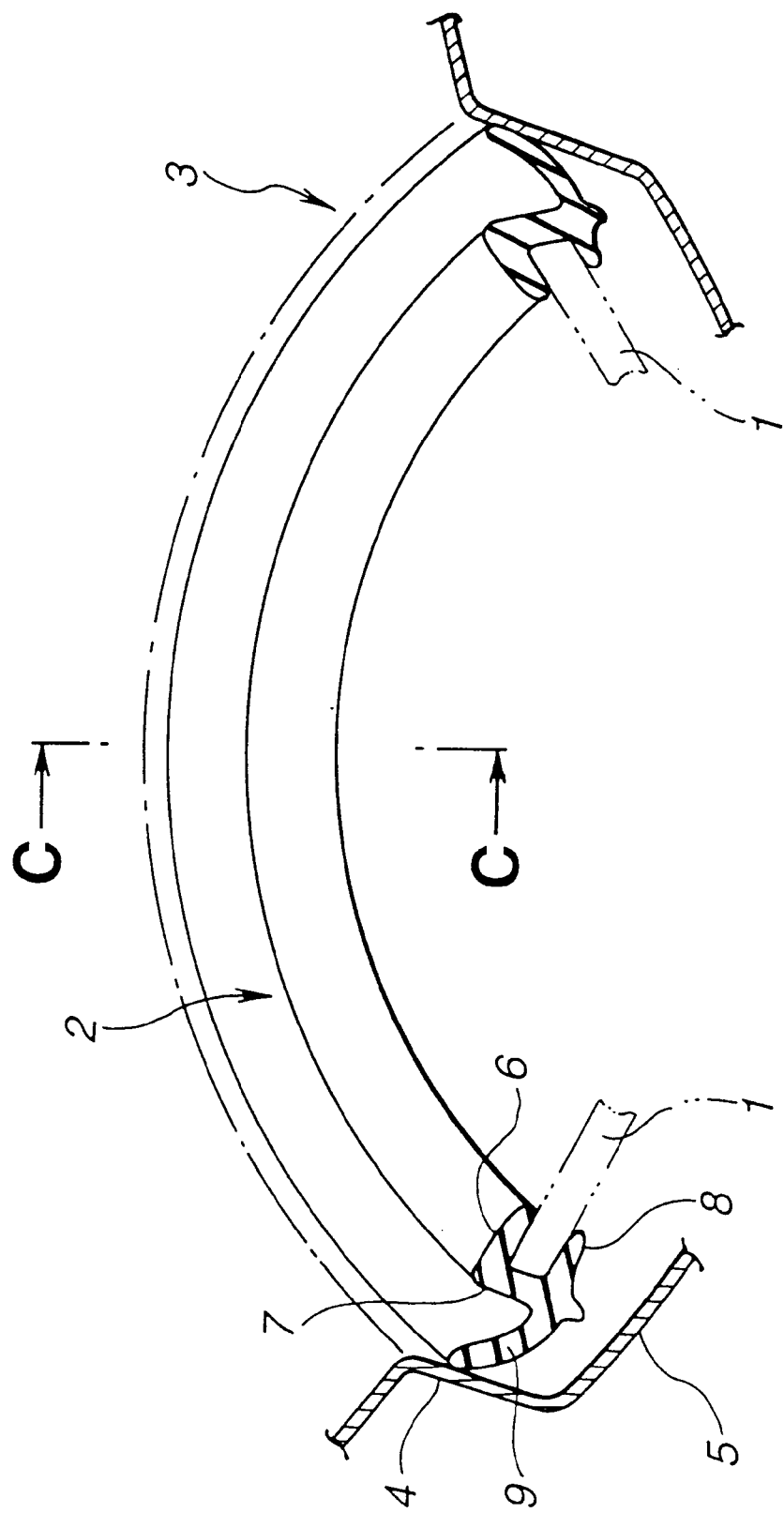
FIG. 1 is a perspective view of a window molding according to a preferred embodiment of the present invention, formed on a curved corner of a window glass.
Figure 2:
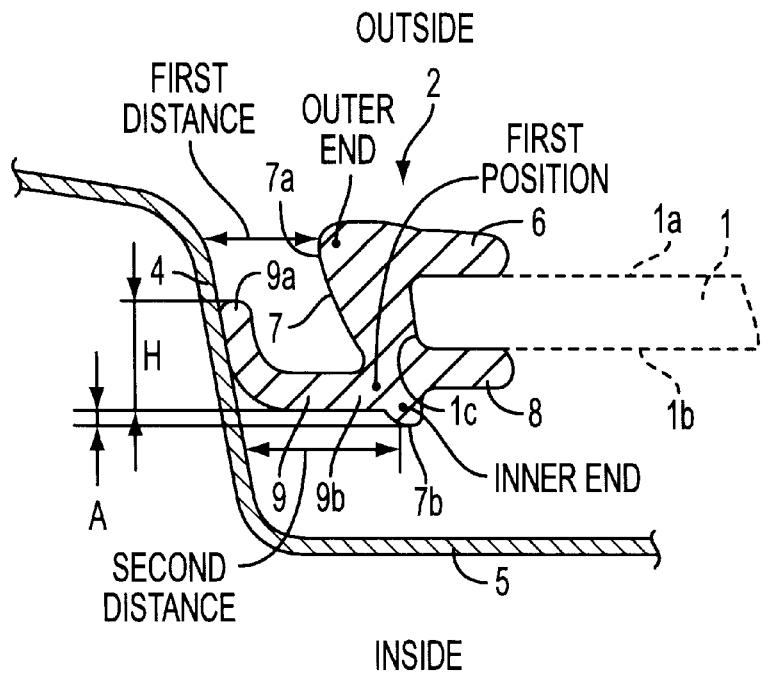
FIG. 2 is a cross section showing the window molding along a side of the window glass.
Figure 3:
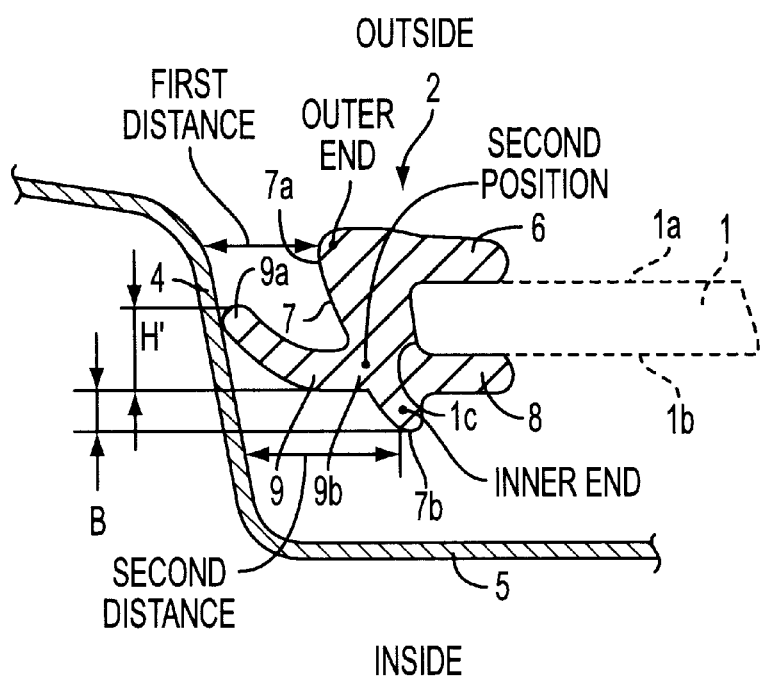
FIG. 3 is a cross section taken along lines C—C in FIG. 1.

As shown in FIGS. 1–3, a window molding 2 according to a preferred embodiment of the present invention is formed on a periphery of a window glass 1.

For example, the window molding 2 is made of rubber and is extruded in a straight form and thereafter is mounted on the periphery of the window glass 1.

Although not shown in the drawings, the window glass 1 may be generally rectangular in shape. In this case, the window glass 1 has first to fourth sides and four curved corners, one of which (see FIG. 1) is defined between the first and second sides. The window glass 1 may be an automotive rear window glass, but is not limited thereto.

As is seen from FIG. 1, a section of a panel 3 of a motor vehicle, on which the window glass 1 is mounted, has an essentially L-shaped cross section. This section of the panel 3 has a side wall portion 4 which may be substantially in parallel with an end surface of the window glass 1, and a bottom wall 5 which is connected with the side wall portion 4. The window glass 1 is fixed to the bottom wall 5 via an adhesive (not shown).

The window molding 2 which has an essentially U-shaped cross section has an external wall portion 6 which covers a peripheral portion of an external major surface 1a of the window glass 1, an internal wall portion 8 which covers a peripheral portion on an internal major surface 1b of the window glass 1, and a base wall portion 7 which covers an end surface 1c of the window glass 1.

The base wall portion 7 of the window molding 2 is inclined with respect to the side wall portion 4 of the panel 3 in a manner as illustrated in FIGS. 2 and 3. In other words, the base wall portion 7 has an inner end 7b and an outer end 7a. The outer end 7a is located nearer the exterior of the motor vehicle than the inner end 7b and is such that, due to the inclination, a first distance between the outer end 7a and the side wall portion 4 of the panel 3 is shorter than a second distance between the inner end 7b and the side wall portion 4 of the panel 3 (see FIGS. 2 and 3).

A lip 9 which seals a space defined between the base wall portion 7 and the side wall portion 4 of the panel 3 is arranged to be formed at two different positions on the base wall portion 7, and thus extend along at two different locations with respect to the window glass 1 (i.e., a first location for the portion of the molding which are disposed on the straight sides, and the second location for portions of the molding which are disposed on the corners).

Along the first and second sides of the window glass 1, as shown in FIG. 2, the lip 9 is formed to extend out from the base wall portion 7, at a distance A from the inside end 7b of the base wall portion 7. At the corner of the window glass 1, as shown in FIG. 3, the lip 9 is formed to extend out from the base wall portion 7, at a distance B from the inside end 7b of the base wall portion 7. As is understood from FIGS. 2 and 3, the distance B is greater than the distance A.

The window molding 2 is produced using a variable extrusion molding method. With this, the lip 9 becomes smoothly continuous throughout the first location and the second location.

The window molding 2 having the above constructions achieves a good external appearance in that, at the corner, the end 9a of the lip 9 of the window molding 2 is elongated in the along-the-corner direction, thereby shortening (relatively shorter than along the first and second sides of the window glass 1) the lip 9 in height (see H in FIG. 2, and H' in FIG. 3). In other words, the length of the lip 9 is shortened at the corner between the bottom 9b and the tip or end 9a, as compared with the portions of the molding which extend along the first and second sides. Thus, according to the present invention, at the corner portion of the molding, the position where the bottom 9b of the lip 9 is connected to the base wall portion 7 is more outwardly deflected than that along the first and second sides of the window glass 1 (due to distance A<distance B). Thereby, substantially no difference is caused, between the first and second sides and the corner of the window glass 1, in the position where the end 9a of the lip 9 contacts the side wall portion 4 of the panel 3.

Furthermore, by shifting the level or position at which the lip 9 extends out from the base wall portion 7, toward the outside or exterior of the motor vehicle, the lip 9 can be maintained in contact with the side wall portion 4 of the panel 3 at the corners in substantially the same manner as the lip 9 along the first and second sides of the window glass 1. Thus, it becomes possible to obviate the reduction in pressing force of the lip 9 against the side wall portion 4 of the panel 3 at the corners. Thereby, the undesirable phenomena which occurs with the prior art can be prevented. That is to say, when the motor vehicle is running at a high speed and a large pressure differential between the interior and exterior of the motor vehicle develops, the lip 9 is prevented from detaching from the panel 3. Accordingly, the air flows which tends to pass through the unsealed space at the corners is prevented thus obviating the vibration and impacting of the lip on the side wall portion 4 of the panel 3.

What is claimed is:

1. A window molding for a window glass of a motor vehicle, said window glass having first and second sides and a corner defined therebetween, said window molding comprising:

an external wall portion covering a peripheral portion on an external major surface of said window glass;

an internal wall portion covering a peripheral portion on an internal major surface of said window glass, said internal wall portion being opposed to said external wall portion;

a base wall portion covering an end surface of said window glass, said base wall portion connecting said external and internal wall portions, said base wall portion having a surface opposed to a panel of said motor vehicle, said base wall portion having an inner end and an outer end, the outer end being adapted to be nearer to an outside of said motor vehicle than said inner end, said surface being oriented so that a first distance between the outer end and the panel is shorter than a second distance between the inner end and the panel; and a lip for sealing a space defined between said surface of said base wall portion and the panel, said lip extending toward the panel from a first location which is proximate the inner end of said base wall portion and which extends along a portion of said window molding disposed against one of the first and second sides of the window glass, and extending toward the panel from said base wall portion from a second location which is closer to the outer end than the first location and which extends along a portion of said window molding disposed against the corner of said window glass.

2. A window molding according to claim 1, wherein said surface of said base wall portion is inclined with respect to the panel such that said first distance is shorter than said second distance.

3. A window molding according to claim 1, wherein a distance between the second location and the panel is shorter than a distance between the first location and the panel such that a contact position between said lip and the panel, remains at an essentially constant level relative to the window glass.

4. A window molding according to claim 1, wherein irrespecitve of whether the lip extends from the first location or from the second location said lip is pressed against said panel with a substantially constant force.

5. A window molding according to claim 1, wherein said window glass is a rear window glass.

6. A window molding according to claim 1, wherein said lip is smoothly continuous as it changes between said first and second locations.

7. A molded window glass of a motor vehicle, comprising:

(a) a window glass having first and second sides and a corner defined therebetween; and (b) a window molding mounted on said window glass, said window molding comprising:

(1) an external wall portion covering a peripheral portion on an external major surface of said window glass;

(2) an internal wall portion covering a peripheral portion on an internal major surface of said window glass, said internal wall portion being opposed to said external wall portion;

(3) a base wall portion covering an end surface of said window glass, said base wall portion connecting said external and internal wall portions, said base wall portion having a surface opposed to a panel of said motor vehicle and an inner end and an outer end, the outer end being nearer to an outside of said motor vehicle than said inner end, said surface being oriented such that a first distance between said outer end and said panel is shorter than a second distance between said inner end and said panel; and (4) a lip for sealing a space defined between said surface of said base wall portion and said panel, said lip:

extending toward said panel from a first location which is proximate said inner end and which extends along said window molding disposed against one of the first and second sides of the window glass, extending toward the panel from said base wall portion from a second location which is closer to the outer end than the first location and which extends along a portion of said window molding disposed against the corner of said window glass.

\* \* \* \* \*